United States Patent
Sayyar-Rodsari

(10) Patent No.: US 8,032,235 B2
(45) Date of Patent: Oct. 4, 2011

(54) MODEL PREDICTIVE CONTROL SYSTEM AND METHOD FOR REDUCTION OF STEADY STATE ERROR

(75) Inventor: Bijan Sayyar-Rodsari, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 386 days.

(21) Appl. No.: 12/147,961

(22) Filed: Jun. 27, 2008

(65) Prior Publication Data

US 2009/0005889 A1    Jan. 1, 2009

Related U.S. Application Data

(60) Provisional application No. 60/946,879, filed on Jun. 28, 2007.

(51) Int. Cl.
- G05B 13/02 (2006.01)
- G05B 11/01 (2006.01)
- G05B 19/42 (2006.01)
- G01N 15/08 (2006.01)
- G05B 15/00 (2006.01)
- G05B 19/00 (2006.01)

(52) U.S. Cl. ............... 700/29; 700/30; 700/44; 700/45; 700/78; 700/89; 700/258; 700/263; 700/266; 702/12

(58) Field of Classification Search ............. 700/44, 700/29, 45, 89, 30, 78, 258, 263, 266; 702/12

See application file for complete search history.

(56) References Cited

U.S. PATENT DOCUMENTS

| | | | | |
|---|---|---|---|---|
| 4,663,704 A | * | 5/1987 | Jones et al. | 700/83 |
| 4,669,040 A | * | 5/1987 | Pettit et al. | 700/42 |
| 4,903,192 A | * | 2/1990 | Saito et al. | 700/37 |
| 5,111,531 A | * | 5/1992 | Grayson et al. | 706/23 |
| 5,142,612 A | * | 8/1992 | Skeirik | 706/23 |
| 5,153,807 A | * | 10/1992 | Saito et al. | 700/45 |
| 5,245,528 A | * | 9/1993 | Saito et al. | 700/41 |
| 5,347,446 A | * | 9/1994 | Iino et al. | 700/29 |
| 5,408,406 A | * | 4/1995 | Mathur et al. | 700/45 |
| 5,609,136 A | * | 3/1997 | Tuken | 123/357 |
| 5,691,896 A | * | 11/1997 | Zou et al. | 700/37 |
| 6,056,781 A | * | 5/2000 | Wassick et al. | 703/12 |
| 6,122,557 A | * | 9/2000 | Harrell et al. | 700/45 |
| 6,263,355 B1 | * | 7/2001 | Harrell et al. | 708/320 |
| 6,278,962 B1 | * | 8/2001 | Klimasauskas et al. | 703/13 |

(Continued)

OTHER PUBLICATIONS

Motee et al., "Optimal Partitioning in Distributed Model Predictive Control", IEEE, 2003, p. p. 5300-5305.*

(Continued)

*Primary Examiner* — Albert Decady
*Assistant Examiner* — Thomas Stevens
(74) *Attorney, Agent, or Firm* — Fletcher Yoder LLP; William R. Walbrun; John M. Miller

(57) ABSTRACT

A technique is disclosed for reducing an error in a controlled variable via model predictive control. A predicted error in the controlled variable is determined for a forward-looking control horizon based upon measured or computed variables. The integral of the predicted error is computed. If the error or the integral exceed a tolerance for a determined time period, the model predictive control algorithm is modified to drive the error or the integral to within a tolerance. The modifications to the control algorithm may include changes to coefficients for terms based upon the error and/or the integral of the error.

15 Claims, 3 Drawing Sheets

U.S. PATENT DOCUMENTS

| | | | |
|---|---|---|---|
| 6,498,968 B1* | 12/2002 | Bush | 701/3 |
| 6,714,899 B2* | 3/2004 | Kassmann | 703/2 |
| 6,738,677 B2* | 5/2004 | Martin et al. | 700/44 |
| 6,825,631 B1* | 11/2004 | Nakamura | 318/560 |
| 7,006,900 B2* | 2/2006 | Zhenduo et al. | 700/299 |
| 7,024,253 B2* | 4/2006 | Gaikwad et al. | 700/37 |
| 7,113,834 B2* | 9/2006 | Wojsznis et al. | 700/33 |
| 7,133,784 B2* | 11/2006 | Vaidyanathan et al. | 702/30 |
| 7,216,006 B2* | 5/2007 | Yasui et al. | 700/54 |
| 7,246,753 B2* | 7/2007 | Hull et al. | 236/49.3 |
| 7,272,454 B2* | 9/2007 | Wojsznis et al. | 700/29 |
| 7,310,572 B2* | 12/2007 | Havlena et al. | 700/291 |
| 7,346,403 B2* | 3/2008 | Tanaka et al. | 700/52 |
| 7,403,832 B2* | 7/2008 | Schulze et al. | 700/110 |
| 7,418,372 B2* | 8/2008 | Nishira et al. | 703/2 |
| 7,444,191 B2* | 10/2008 | Caldwell et al. | 700/29 |
| 7,496,414 B2* | 2/2009 | Boe et al. | 700/44 |
| 7,610,108 B2* | 10/2009 | Boe et al. | 700/44 |
| 7,624,079 B2* | 11/2009 | Hartman et al. | 706/16 |
| 7,653,445 B2* | 1/2010 | Chia et al. | 700/28 |
| 7,669,777 B2* | 3/2010 | Hull et al. | 236/49.3 |
| 7,693,588 B2* | 4/2010 | Hong et al. | 700/61 |
| 7,702,519 B2* | 4/2010 | Boyden et al. | 422/177 |
| 7,792,604 B2* | 9/2010 | Hong et al. | 700/188 |
| 2002/0166973 A1* | 11/2002 | Frederick et al. | 250/361 R |
| 2008/0208778 A1* | 8/2008 | Sayyar-Rodsari et al. | 706/12 |
| 2008/0235166 A1* | 9/2008 | Sayyar-Rodsari et al. | 706/12 |
| 2009/0143871 A1* | 6/2009 | Gao et al. | 700/29 |

OTHER PUBLICATIONS

Piche et al., "Nonlinear Model Predictive Control Using Neural Networks", IEEE, p. 53-62.*

Goulart et al., "Ouput Feedback Receding Horizon Control of Costrained Systems", 2007, International Journal of Control, pp. 8-20.*

* cited by examiner

MODEL PREDICTIVE CONTROL SYSTEM AND METHOD FOR REDUCTION OF STEADY STATE ERROR

CROSS REFERENCE TO RELATED APPLICATIONS

This application is a Non-Provisional Application of U.S. Provisional Application No. 60/946,879, entitled "Optimization-Based integral Control for Nonlinear Model Predictive Control and Applications", filed Jun. 28, 2007, which is herein incorporated by reference.

BACKGROUND

The present invention relates generally to control systems, and more particularly to model predictive control employing novel techniques for driving a steady state error to within a desired tolerance.

Many applications are known throughout industry for various types of control systems, and various control system designs fill such applications. In general, feedback control systems provide for sensing one or more detectable parameters of a process, and drive a controlled variable to a desired level on the basis of the sensed parameters. The basis for such control system design may be parametric models, neural networks, linear and non-linear models, to name only a few. In model predictive control systems anticipated trajectories or future values for measured and controlled variables may be made based upon prior knowledge, and control may be designed to obtain desired values of these predicted variable trajectories.

A particular problem with existing control systems, and particularly with model predictive control systems is the tendency to maintain or permit a sustained steady state error. That is, under normal conditions, the control system will drive the controlled variable to a desired level over time. However, because the system may be designed to avoid very rapid changes in variable levels, relatively constant errors may exist between the actual level of a controlled variable and the desired level. The controlled variable itself may consist of any variable susceptible to control, such as temperatures, pressures, flow rates, or any other variable whatsoever in the process. Various techniques may be used to drive the controlled variable to the desired level, including the use of offsets, correction factors, and so forth. However, there is a need for a simple and effective technique for reducing such steady state errors, particularly in model predictive control systems that avoids the "temporary fix" type solution offered by offset corrections and similar approaches.

BRIEF DESCRIPTION

The present invention provides a technique for reducing steady state error in model predictive control systems designed to respond to such needs. The technique may be used in any suitable control system, including those used in industrial applications, commercial applications, vehicles, manufacturing applications, and so forth. The technique does not require offsets or alteration of basic control models, although it may be used conjunction with systems that permit such adaptability.

In general, the present technique is based upon the detection of a steady state error between a forward looking prediction of a variable and a desired value for the variable. The steady state error is generally detected over a persistence time to avoid adapting or responding to the error unnecessarily. If a steady state error is detected and persists for a threshold time, a value of the model predictive control algorithm is modified to reduce the error. In particular, the modification may consist of increasing a cost for one or more variables that are not at the desired level or that influence the variable that is not at the desired level. The modification may be made in a cost or objective function implemented by the system, such as in a coefficient of one or more variables. The technique may effectively modify the coefficient based upon an integral of the difference between the controlled variable and a desired level over a forward looking control horizon. When this integral value is large, the coefficient in the cost function is large, thus driving the value to the desired level. The integral is forward-looking due to the predictive nature of the model predictive control scheme. As the error is reduced, the coefficient causing the error to be reduced is naturally reduced as well.

DRAWINGS

These and other features, aspects, and advantages of the present invention will become better understood when the following detailed description is read with reference to the accompanying drawings in which like characters represent like parts throughout the drawings, wherein.

Figure 7:
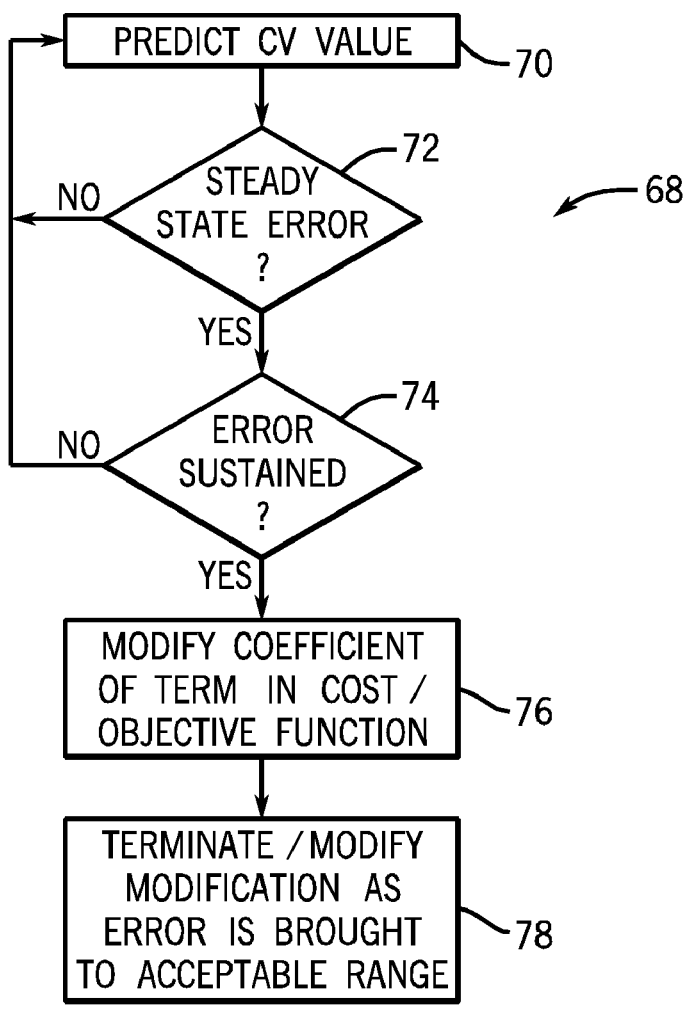
Figure 8:
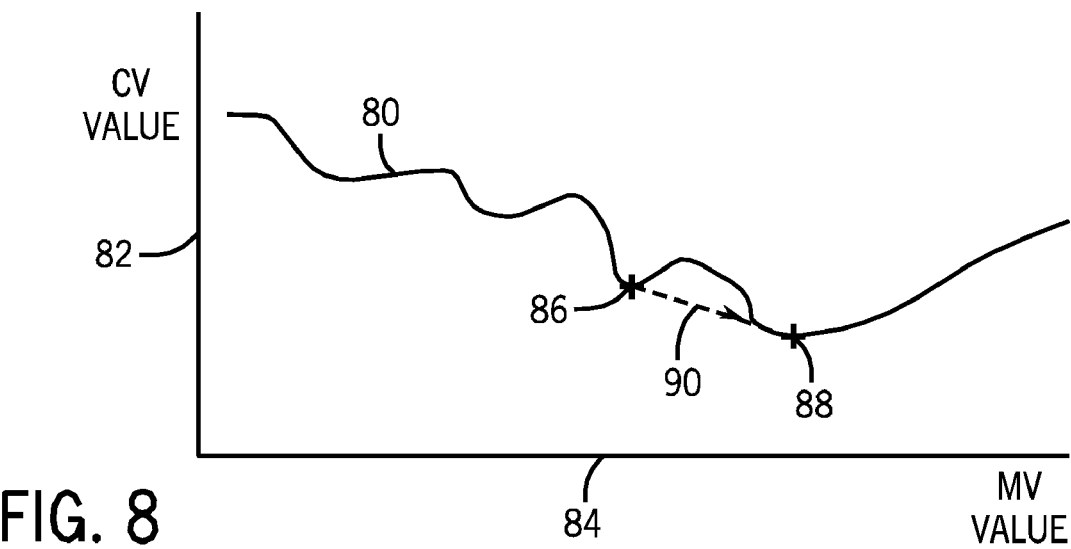

FIG. 7 illustrates exemplary logic for carrying out the present technique for reducing steady state error; and FIG. 8 is a graphical representation of an exemplary control variable value plot illustrating values of the control variable and local and global optimum values to demonstrate how the present technique effectively drive the controlled variable from a local optimum or steady state condition to a desired optimum or set point.

DETAILED DESCRIPTION

Figure 1:
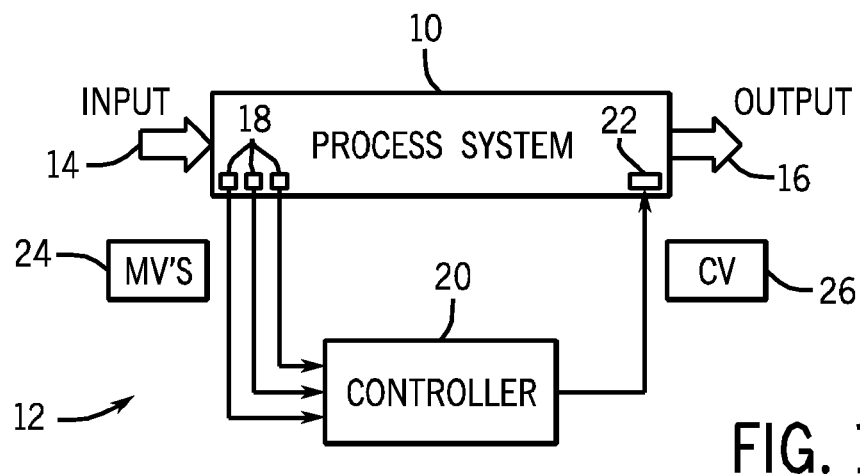
FIG. 1 is diagrammatical representation of a process system equipped with a control system designed to implement the present technique.

Turning now to the drawings, and referring first to FIG. 1, a process system 10 is illustrated that is at least partially regulated by a control system 12. As will be appreciated by those skilled in the art, the process system 10 may be any conceivable type of process, such as a manufacturing process, a steady state or batch process, a chemical process, a material handling process, an engine or other energy utilizing process, an energy production process, and so forth. In general, the process system 10 will receive one or more inputs 14 and produce one or more outputs 16. In complex processes found in the industry, many such inputs may be utilized, including feed stocks, electrical energy, fuels, parts, assemblies and sub-assemblies, and so forth. Outputs may include finished products, semi-finished products, assemblies, manufacturing products, by products, and so forth. Based upon the system dynamics, the physics of the system and similar factors, the control system 12 will regulate operations of the process system to control both the production of the outputs as well as quality of the outputs, and so forth.

In the embodiment illustrated in FIG. 1, the process system is instrumented by a number of sensors 18 that detect parameters of the process system. In general, such sensors may include measurement devices, transducers, and the like that may produce discrete or analog signals and values representative of various variables of the process system. Such sensors commonly produce voltage or current outputs that are representative of the sensed variables. The sensors are coupled to a controller 20 which will typically include an application-specific or general purpose computer, processor, or other programmable device programmed to carryout the functions described herein. In practice, many such sensors and more than one controller may be provided in the control system, and where multiple controllers are provided these may be adapted to cooperatively function to control the process system. The controller will typically output signals to one or more actuators 22 that serve to alter portions of the process system to regulate the output. Such actuators may include, by way of example only, valves, motors, position devices, pumps, and so forth.

The sensors 18 may be generally considered to provide signals representative of measured variables (MVs) as indicated at reference numeral 24. These MVs, again, may be analog or digital signals or values, and may be measured directly by the sensors, or in certain applications may be derived from measured values. Thus, although not represented separately in FIG. 1, based upon certain measured values, the controller 20 or other signal processing circuitry, may develop or derive values for certain system parameters based upon a knowledge of relationships between the measured values and those desired parameters. Such inference may be particularly useful where control is desired based upon particular system parameters, but those parameters are impossible or difficult to detect. The present technique for model predictive control may thus employ virtual on-line analyzers (VOAs) that effectively produce a value of an operational parameter by differentially determining certain desired variables for control purposes. The controller then outputs or derives one or more controlled variables (CV) as indicated by reference numeral 26. In practice, the CV may or may not be communicated to the actuator itself. That is, the actuator may receive drive signals for producing desired value of the CV, such as a valve position signal for driving a valve actuator to cause a desired flow rate, the flow rate itself being the CV.

Figure 2:
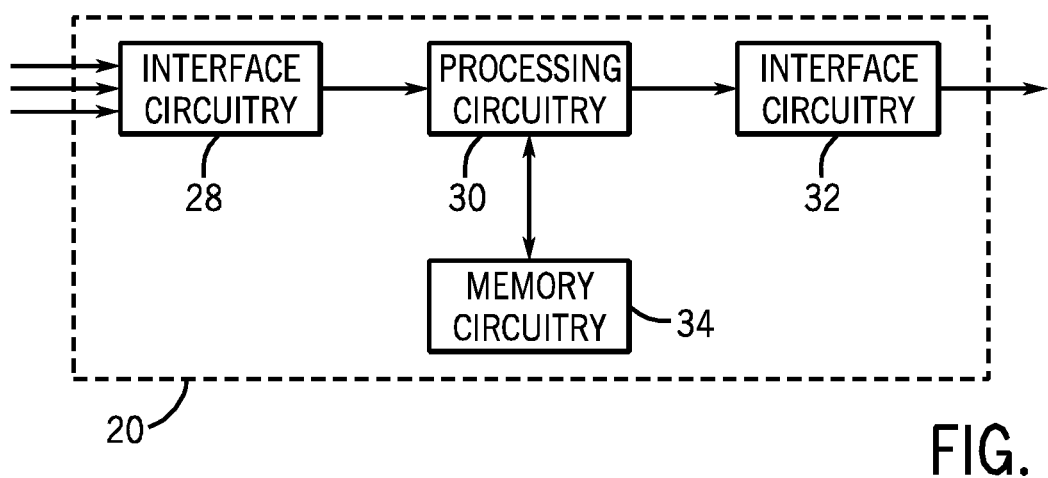
FIG. 2 is a diagrammatical representation of certain functional components of the control system illustrated in FIG. 1.

FIG. 2 illustrates exemplary components that may be included in a controller of the type illustrated in FIG. 1. Many other components may be included, depending upon the system design, the type of system controlled, the system control needs, and so forth. In the embodiment illustrated in FIG. 2, interface circuitry 28 receives the values or signals from the sensors 18. The interface circuitry may include filtering circuitry, analog-to-digital conversion circuitry, and so forth. The interface circuitry is in data communication with processing circuitry 30 which may include any suitable processor, such as a microprocessor, a field programmable gate array, and so forth. The processing circuitry carries out control functions, and in the present embodiment performs model predictive control functions based upon knowledge of the process system. The processing circuitry will develop values for the controlled variable, including forward-looking trajectories for the MVs and CV depending upon the model predictive control algorithms implemented. Based upon the control algorithm, then, the processing circuitry will output signals to interface circuitry 32 that is used to drive the actuators of the process system. Such interface circuitry may include various driver circuits, amplification circuits, digital-to-analog conversion circuitry, and so forth. Memory circuitry 34 is provided for storing both the routines executed by the processing circuitry 30 as well as certain desired variables, variable settings, and so forth. In addition to the components illustrated in FIG. 2, where multiple controllers operate in a cooperative fashion, communications interface circuitry will be generally provided, including circuitry used to network the controller with other controllers and remote monitoring and control systems.

Figure 3:
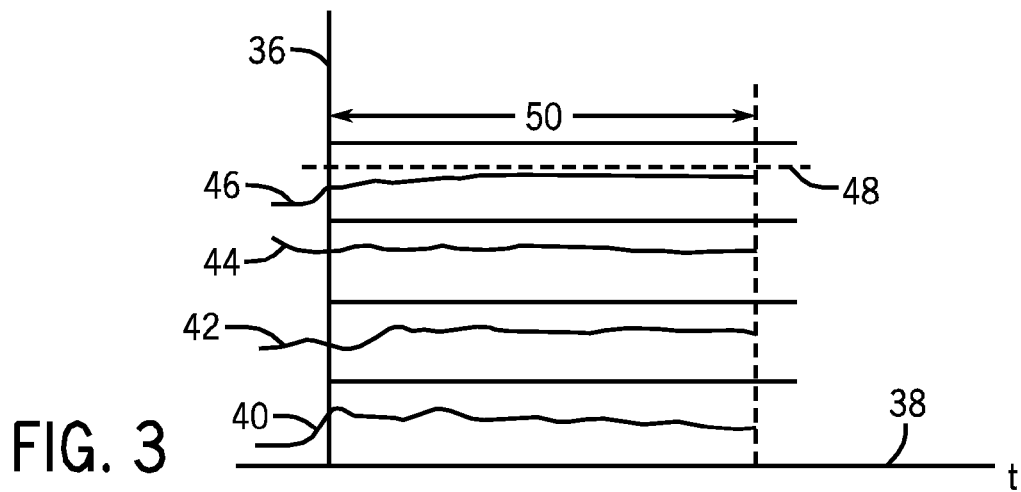
FIG. 3 is a graphical representation of certain variable trajectories projected into the future for a model predictive control algorithm, and illustrating a steady state error in a controlled variable.

FIG. 3 is a graphical representation of certain exemplary trajectories for measured variables and a control variable in an exemplary implementation of the system discussed above. As illustrated in FIG. 3, the model predictive control algorithm may be considered to generate forward-looking values for variables as indicated by a plurality of variable axes 36 and a time axis 38. In the embodiment of FIG. 3, three trajectories are shown for measured variables, as indicated by reference numerals 40, 42 and 44. That is, from a beginning time represented by the vertical axis 36, the control routine will predict variable values into the future. Similarly, the control routine will predict a controlled variable trajectory 46. In general, the controlled variable will be a function of the measured variables, with the controlled variable being determined or optimized based upon a combination of the measured variable values. The manner in which the measured variables are combined to determine the value of the controlled variable is the result of known relationships between the measured variables and the controlled variable. The measured variables are determined and the controlled variable is forecast to drive the controlled variable to a desired level as indicated by the dashed line 48 in FIG. 3. As will be appreciated by those skilled in the art, although a constant set point 48 is illustrated in FIG. 3, variable set points or changing values for the controlled variable may, of course, be implemented. In general, the model predictive control algorithm forecasts the values for the measured variables and control variable over a control horizon 50. The control horizon is a time in the future over which variable values can be forecast and controlled.

Figure 4:
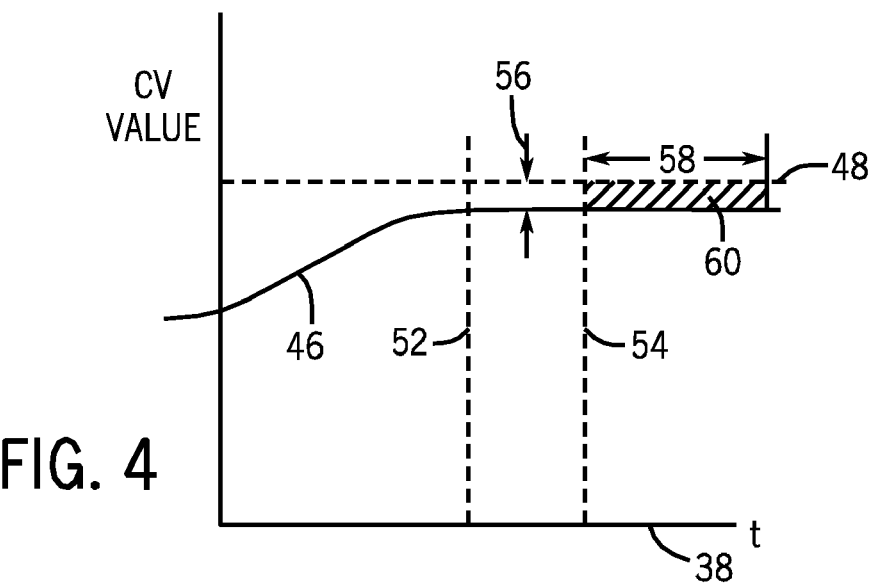
FIGS. 4, 5 and 6 are graphical representations illustrating a trajectory of a controlled variable being driven to a set point and thereby reducing a steady state error in accordance with the present technique.

FIG. 4 is a more detailed representation of an exemplary CV value trajectory over time. As illustrated in FIG. 4, based upon knowledge of the measured variables and their relationship to one another and to the controlled variable, the controlled variable can be driven toward the desired value as indicated again by dashed line 48. However, in certain situations, the system may not adequately drive the controlled variable to the desired level, producing a steady state error 56 which is effectively a difference between the actual controlled variable value and the desired controlled variable value. In a model predictive control system this error may generally be considered as a predicted error extending into the future. The cause of such errors may be many. For example, the system dynamics, dampening of responses implemented by the model, and so forth may cause a constant or relatively constant steady state error to be sustained for extended periods of time. The present technique allows for driving such steady state errors to within a desired tolerance as described below.

Figure 5:
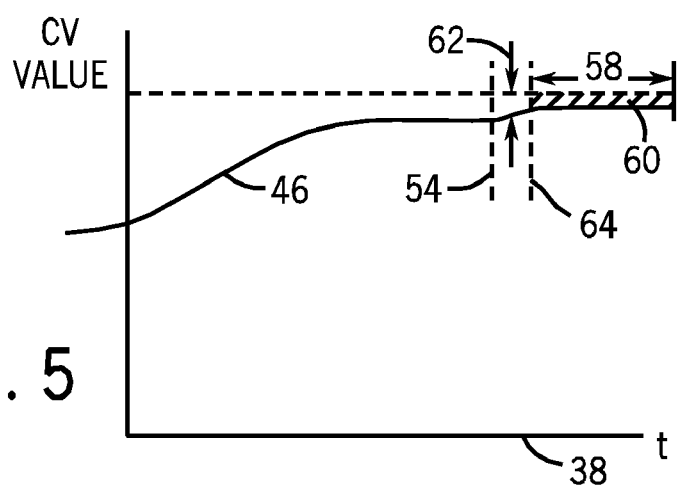
Figure 6:
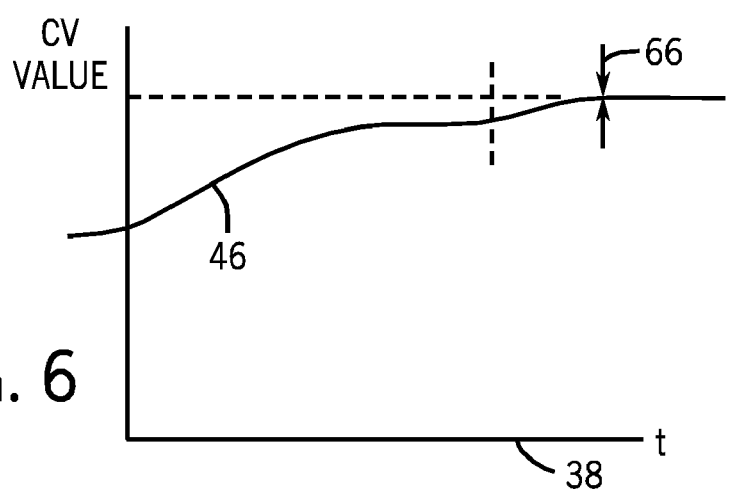

FIGS. 4, 5 and 6 are illustrative of the reduction of a steady state error by the present technique. The process will be described in conjunction with these figures and the exemplary logic illustrated in FIG. 7.

As shown in FIG. 7, the exemplary logic 68, implemented by the processing circuitry discussed above with reference to FIG. 2, begins with predicting the variable values. At step 70, the CV value is predicted, and at step 72 the logic determines whether a steady state error is likely to exist. Again, this steady state error will typically be a difference between a desired value for the CV and its predicted value according to the predictions made by the model predictive control algorithm. If a steady state error does not exist, the logic may return to step 70. In general, as will be appreciated by those skilled in the art, a steady state error may be considered to exist if the predicted value of the CV is different from the desired value of the CV by more than a desired tolerance. That is, for example, an exact match of the desired CV value may not be practical or may not be economical to maintain, and slight tolerances or differences from the desired value may be permitted. However, at step 72, the determination is made as to whether the predictive value for the CV is outside of such tolerance.

If a steady state error is detected at step 72, the logic may determine whether the error has been sustained for a threshold time, as indicated at step 74. That is, as best illustrated in FIG. 4, from an initial time 52, the algorithm may determine whether a steady state error 56 has persisted, as indicated by a time difference between initial time 52 and threshold time 54. If the threshold time (that is, the time difference between time 54 and time 52 in FIG. 4) has not elapsed, the routine may continue to monitor the steady state error by returning to step 70 and step 72 in FIG. 7. The delay in the onset of the following steps to drive the steady state error to a reduced value is particularly useful to prevent the system from inefficient use of resources in reducing steady state errors that do not persist over time.

If the steady state error has been detected and has persisted for at least the desired tolerance time, the logic proceeds to step 76 in FIG. 7. At step 76, a modification is made to the cost or objective function implemented by the model predictive control algorithm. As will be appreciated by those skilled in the art, such model predictive control algorithms may implement cost or objective functions that may be represented as a constrained optimization problem as follows:

$$\min_{\delta u_i(t+k)} J_d + J_o + J_m,$$

subject to the process system model, for $\forall j \in \{i, \ldots, N_y\}$, $\forall k \in \{i, \ldots, T_h\}$, and $\Delta u_i^-(t+k) \leq \delta u_i(t+k) \leq \Delta u_u^+(t+k)$, $\forall i \in \{i, \ldots, N_u\}$, $\forall k \in \{i, \ldots, T_h\}$, and $u_i^{min}(t+k) \leq \delta u_i(t+k) \leq \Delta u_i^+(t+k)$, $\forall i \in \{i, \ldots, N_u\}$, $\forall k \in \{i, \ldots, T_h\}$, where $\delta u_i(t+k)$ is the decision vector for the ith measured (or computed variable) at time t+k, $\Delta u_i^-(t+k)$ and $\Delta u_i^+(t+k)$ are the maximum allowable decrease or increase in the ith measured or computed variable at time t+k, $J_d$ is the cost of deviation from the desired behavior, Jo is the economic cost of the operating condition of the process, Jm is the cost of moves in the variables, $N_u$ is the number of controlled variables, and $T_h$ is the prediction or control horizon (in time).

The main component of the cost is:

$$J_{d,1} = \sum_{i=1}^{N_u} \sum_{k=1}^{T_h} \mu_i^u(t+k) \left( \frac{u_i(t+k) - u_i^d(t+k)}{s_i^u(t+k)} \right)^2 +$$

$$\sum_{j=1}^{N_y} \sum_{k=1}^{T_h} \mu_j^y(t+k) \left( \frac{y_i(t+k) - y_i^d(t+k)}{s_j^y(t+k)} \right)^2$$

where it may be noted that the desired input, $u_i^d(t+k)$, the desired output, $y_i^d(t+k)$, scaling factors, $s_i^u(t+k)$ and $s_j^y(t+k)$, and weighting coefficients $\mu_i^u(t+k)$ and $\mu_j^y(t+k)$ are all trajectories. It may also be noted that $\mu_i^u(t+k)$ and $\mu_j^y(t+k)$ are candidate coefficients that can be modified to eliminate steady state error, as provided for by the present technique.

Moreover, the cost associated with steady state operation may be expressed by the relationship:

$$J_o = \sum_{i=1}^{N_u} \sum_{k=1}^{T_h} \rho_i^u(t+k) u_i(t+k) + \sum_{j=1}^{N_y} \sum_{k=1}^{T_h} \rho_j^y(t+k) y_i(t+k),$$

where, again, where it may be noted that the desired input, $u_i^d(t+k)$, the desired output, $y_i^d(t+k)$, and weighting coefficients $\rho_i^u(t+k)$ and $\rho_j^y(t+k)$ are all trajectories, and $\rho_i^u(t+k)$ and $\rho_j^y(t+k)$ are candidate coefficients that can be modified to eliminate steady state error.

Similarly, the cost associated with changes in the measured or computed variables may be expressed by the relationship:

$$J_m = \sum_{i=1}^{N_u} \sum_{k=1}^{T_h} \lambda_i^u(t+k) \left( \frac{u_i(t+k) - u_i(t+k-1)}{s_i^{\delta u}(t+k)} \right)^2,$$

where scaling factors, $s_i^{\delta u}(t+k)$, and weighting coefficients $\lambda_i^u(t+k)$ are trajectories, and the latter are also candidates for modification by the algorithm.

The constrained optimization implemented in the control approach may, in general, be considered cost functions or objective functions, depending upon whether weighting values are representative of costs (typically to be minimized) or objectives (typically to be maximized). Values of coefficients for each variable may be set to establish desired relationships between variables and to provide the response to move the controlled variable in the desired way based upon the measured variables. However, in a present implementation, rather than using a fixed value for the coefficients, one or more of the coefficients may be referenced to a changing value, such as an integral value of the steady state error over a forward-looking control horizon.

As illustrated in FIG. 4, for example, once the steady state error is detected and is sustained for at least the time threshold required, one or more coefficients of the cost or objective function may be reflective of the integral value 60 that is the product of the steady state error 56 over the control horizon 58. Depending upon whether the algorithm implements a cost or objective function, the coefficient of one or more of the measured variables included in the function may be increased or decreased to drive the predicted value controlled variable to the desired level. Such modifications in one or more coefficients may be linear, non-linear, or dictated any relationship that may be programmed into the routine (that is, the coefficient may itself be a function, such as of the integral of the predicted error over the control horizon).

As will be appreciated by those skilled in the art, then, control in accordance with the model predictive control algorithm advances in steps over time, with the algorithm being re-run to optimize the cost or objective function time steps later than the threshold time 54 shown in FIG. 4. Thus, as shown in FIG. 5, the error will be reduced as indicated by reference numeral 62, at a later time 64. As the later times are encountered, then, the control horizon 58 will be further extended out in time, but the integral value 60 will continue to be computed and used to modify the coefficient of at least one term of the cost or objective function. As noted above, the coefficient value or values altered need not be an actual multiple or proportion of the integral value, and various relationships between this integral value and the modified coefficient or coefficients may be proposed, including fractional values, multiples, power relationships, additive relationships, and so forth, which may change the modified coefficient value or values over successive time steps. As will also be appreciated, and as illustrated in FIG. 5, as the steady state error is reduced, the integral 60 will effectively be reduced, thereby consequently reducing the modification in the cost or objective function coefficient term or terms. Ultimately, as illustrated in FIG. 6, the steady state error will be reduced to a zero or within-tolerance value as indicated by reference numeral 66. When the steady state error is sufficiently reduced, then, the modification in the cost or objective function coefficient term or terms may be terminated as indicated by reference numeral 78 in the exemplary logic of FIG. 7. This termination may quite naturally and automatically occur without operator or other intervention, particularly where the modification is a function of the integral itself.

FIG. 8 represents an exemplary CV value surface as a function of an MV value. The CV value 80, which has magnitudes along axis 82 may vary with one or more variables, a single variable being indicated along axis 84. In practice, the CV value may be a function of many different variables, creating a multi-dimensional surface. The CV value surface 82 may be considered to have a number of different local maxima and minima, with the cost or objective function typically implemented to drive the CV value to the overall or global optimal value. However, a local optimum, such as a minimum as indicated at reference numeral 86, may exist where the CV value may become the solution to the cost or objective function for a considerable time or even indefinitely. In the illustration of FIG. 8, however, it is desirable to drive the CV value to the global optimum as indicated by reference numeral 88. The foregoing technique effectively overcomes one or more topologies 90 between the local optimum and the global optimum by allowing the CV value to be driven or forced to the global optimum regardless of solutions to the cost or objective functions that would otherwise preclude the CV value from searching for or efficiently obtaining this global optimum.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a process via model predictive control comprising:
    determining a predicted error in a controlled variable;
    determining a sustained predicted error in the controlled variable over a forward-looking control horizon;
    determining whether the predicted error or a value based upon the predicted error is above a tolerance;
    modifying a model predictive control algorithm as a function of the determined sustained predicted error to reduce the predicted error only if the predicted error or the value based upon the predicted error is above the tolerance; and
    reducing the modification as the predicted error or the value based upon the predicted error is reduced.

2. The method of claim 1, comprising determining whether the predicted error or the value based upon the predicted error has remained above the tolerance for a determined time period, and modifying the predictive control algorithm only if the predicted error or an integral of the sustained predicted error in the controlled variable over the forward-looking control horizon has remained above the tolerance for at least the determined time period.

3. The method of claim 1, wherein the model predictive control algorithm predicts values of the controlled variable based upon a plurality of terms based upon a plurality of measured or computed variables.

4. The method of claim 3, wherein at least one variable upon which controlled variable values are predicted is computed from measured values for other variables.

5. The method of claim 3, wherein the model predictive control algorithm is modified by changing a coefficient of at least one of the terms.

6. The method of claim 1, wherein the model predictive control algorithm predicts values of the controlled variable in time steps, and wherein the predicted error and the value based upon the predicted error are computed for a control horizon in advance of each time step.

7. The method of claim 1, wherein the model predictive control algorithm is modified without operator intervention.

8. The method of claim 1, wherein the model predictive control algorithm is modified as a function of an integral of the sustained predicted error of the controlled variable over the forward-looking control horizon.

9. A method for controlling a process via model predictive control comprising:
    determining a predicted error in a controlled variable via a model predictive control algorithm that predicts values of the controlled variable based upon a plurality of measured or computed variables over a forward-looking control horizon;
    determining an integral of the predicted error;
    determining whether the predicted error or the integral of the predicted error has remained above a desired tolerance for a determined time period;
    modifying the model predictive control algorithm as a function of the integral to reduce the predicted error only if the predicted error or the integral of the predicted error has remained above the desired tolerance for at least the determined time period; and
    reducing the modification as the integral of the predicted error is reduced.

10. The method of claim 9, wherein at least one variable upon which controlled variable values are predicted is computed from measured values for other variables.

11. The method of claim 9, wherein the model predictive control algorithm includes a plurality of terms based upon the measured or computed variables, and wherein the model predictive control algorithm is modified by changing a coefficient of at least one term.

12. The method of claim 9, wherein the model predictive control algorithm predicts values of the controlled variable in time steps, and wherein the predicted error and the integral of the predicted error are computed for a control horizon in advance of each time step.

13. The method of claim 9, wherein the model predictive control algorithm is modified without operator intervention.

14. A method for controlling a process via model predictive control comprising:
- determining a predicted error in a controlled variable over a forward-looking control horizon via a model predictive control algorithm that predicts values of the controlled variable based upon a plurality of measured or computed variables;
- determining an integral of the predicted error;
- determining whether the predicted error or the integral of the predicted error has remained above a desired tolerance for a determined time period;
- modifying the model predictive control algorithm as a function of the integral to reduce the predicted error only if the predicted error or the integral of the predicted error has remained above the desired tolerance for at least the determined time period;
- reducing the modification as the integral of the predicted error is reduced;
- repeating the foregoing steps until the predicted error or the integral is within a desired tolerance.

15. A system for controlling a process via model predictive control comprising:
- a processing circuit configured to determine a predicted error in a controlled variable over a forward-looking control horizon via a model predictive control algorithm that predicts values of the controlled variable based upon a plurality of measured or computed variables, to determine a value based upon the predicted error, to determine whether the predicted error or the value based upon the predicted error is above a tolerance, to modify the model predictive control algorithm as a function of the value based upon the predicted error to reduce the predicted error only if the predicted error or the value based upon the predicted error is above the tolerance, to reduce modifications as the value based upon the predicted error is reduced, and to repeat the foregoing steps until the predicted error or the value based upon the predicted error is within a desired tolerance.

* * * * *